US009482271B2

(12) United States Patent
Boufflert et al.

(10) Patent No.: US 9,482,271 B2
(45) Date of Patent: Nov. 1, 2016

(54) DISENGAGEABLE AXIAL THRUST BEARING WITH INTERNAL PRELOAD

(71) Applicant: SNECMA, Paris (FR)

(72) Inventors: Sébastien Boufflert, Louviers (FR); Philippe Bourdin, Saint-just (FR); Alban Lemaitre, Vernon (FR); Fabien Tessier, Vernon (FR)

(73) Assignee: SNECMA, Paris (FR)

( * ) Notice: Subject to any disclaimer, the term of this patent is extended or adjusted under 35 U.S.C. 154(b) by 0 days.

(21) Appl. No.: 14/780,038

(22) PCT Filed: Mar. 25, 2014

(86) PCT No.: PCT/FR2014/050699
§ 371 (c)(1),
(2) Date: Sep. 25, 2015

(87) PCT Pub. No.: WO2014/154999
PCT Pub. Date: Oct. 2, 2014

(65) Prior Publication Data
US 2016/0032964 A1    Feb. 4, 2016

(30) Foreign Application Priority Data

Mar. 28, 2013  (FR) ..................... 13 52806

(51) Int. Cl.
| F16C 25/08 | (2006.01) |
| F16C 33/60 | (2006.01) |
| F16C 19/10 | (2006.01) |
| F16C 19/16 | (2006.01) |
| F16C 39/02 | (2006.01) |
| F16C 27/08 | (2006.01) |

(52) U.S. Cl.
CPC ............ F16C 25/083 (2013.01); F16C 19/10 (2013.01); F16C 19/166 (2013.01); F16C 33/60 (2013.01); F16C 27/08 (2013.01); F16C 39/02 (2013.01)

(58) Field of Classification Search
CPC .... F16C 19/166; F16C 25/083; F16C 33/60; F16C 27/08
USPC .................. 384/500, 505, 517–519
See application file for complete search history.

(56) References Cited

U.S. PATENT DOCUMENTS

| 8,540,432 B2 * | 9/2013 | Marciquet ............ F16C 19/163 384/101 |
| 2002/0181818 A1 * | 12/2002 | Bridges ................ F16C 19/163 384/490 |

FOREIGN PATENT DOCUMENTS

| DE | 10 2009 036 303 A1 | 2/2011 |
| FR | 2 698 666 A1 | 6/1994 |

(Continued)

OTHER PUBLICATIONS

English Translation of Search Report mailed on May 16, 2014, in corresponding International PCT Application No. PCT/FR2014/050699, filed on Mar. 25, 2014 (3 pages).

*Primary Examiner* — Phillip A Johnson
(74) *Attorney, Agent, or Firm* — Bookoff McAndrews, PLLC

(57) ABSTRACT

In a disengageable axial thrust bearing for a rotary machine, an outer ring has first and second outer half-rings (114A, 114B) centered in a casing (116) and clamped in the axial direction between a stationary thrust member (118) and a first pre-loading system (120) exerting a first predetermined axial force such that, so long as the axial load exerted on the axial thrust bearing via a synchronization element (106) is greater than a determined threshold value, rolling elements (110) with oblique contacts present respective single lines (130) having two points of contact (130A, 130B) with an inner ring (102) and with the first outer half-ring (114A), the second outer half-ring (114B) being spaced apart from the first by a second predetermined axial force exerted by a second pre-loading system (126) inserted in the axial direction between the first and second outer half-rings, and such that the inner ring (102) is driven in rotation by the synchronization element, whereas, when the axial load exerted on the axial thrust bearing becomes less than this determined threshold value, a second line (132) having two additional points of contact (132A, 132B) is created between each of the oblique-contact rolling elements (110) and the inner ring (102) and the second outer half-ring (103B) such that the axial thrust bearing is disengaged.

10 Claims, 2 Drawing Sheets

(56) References Cited

FOREIGN PATENT DOCUMENTS

| FR | 2 698 667 A1 | 6/1994 |
| FR | 2 932 530 A1 | 12/2009 |
| JP | 2000-320550 A | 11/2000 |
| JP | 2005-201334 A | 7/2005 |
| WO | WO 2010/106264 A1 | 9/2010 |

* cited by examiner

DISENGAGEABLE AXIAL THRUST BEARING WITH INTERNAL PRELOAD

This application is the U.S. national phase entry under 35 U.S.C. §371 of International PCT Application No. PCT/FR2014/050699, filed on Mar. 25, 2014, which claims priority to French Patent Application No. FR 1352806, filed on Mar. 28, 2013, the entireties of each of which are incorporated by reference herein.

FIELD OF THE INVENTION

The present invention relates to a disengageable axial thrust bearing for a rotary machine, the thrust bearing comprising an inner ring arranged around a rotary shaft in radially non-interfering manner on said shaft, a synchronization element mounted on the rotary shaft for driving the inner ring selectively in rotation, an outer ring made up of two half-rings slidably mounted in a casing, and oblique-contact rolling elements.

PRIOR ART

In the context of cryogenic rotary machines mounted on radial fluid bearings, where one of the major advantages of such machines is long lifetime in comparison with machines mounted on conventional ball or roller bearings that are confronted with problems of wear because of the impossibility of providing the necessary lubrication under cryogenic conditions, the Applicant has already proposed disengageable axial thrust bearings in its international application WO 2010/106264, which thrust bearings are for taking up the residual axial forces.

FIG. 4 shows an example of a disengageable axial thrust bearing as described in the above-mentioned international application for use on rotary machines having radial fluid bearings. This figure shows one of the oblique contact rolling elements 1 constituted by balls held captive in a cage 12 and interposed between an inner ring 2 and an outer ring 3 made up of two half-rings 3A and 3B separated by a gap 4 of value that is zero at rest.

The inner ring 2 is mounted with clearance 5 on a main shaft 6 and it can be driven to rotate with the shaft by a synchronization cone 7. The outer half-rings 3A and 3B are mounted relative to the casing 8 in such a manner as to be capable of sliding relative thereto, and they are also clamped in the axial direction between firstly a stationary thrust member 9 and secondly a pre-loading system 10 that exerts a predetermined axial force on the bearing and that may comprise a spring acting axially on the outer ring 3.

The oblique-contact ball bearing as pre-loaded in that way defines a disengageable axial thrust bearing in which each ball 1 has two points of contact, simultaneously with the inner ring 2 and with the outer half-ring 3A.

That prior art disengageable axial thrust bearing nevertheless presents certain drawbacks, in particular because of the need to have good control over the gap 4, which needs to be dimensioned to accept a minimum amount of pre-loading at the moment of disengagement in order to ensure that the system presents good stability once disengaged. It must also enable operation with two points of contact during stages in which the bearing is driven in rotation and is subjected to an axial force. This gap is thus particularly complex to define since it requires good control over the external/internal loading of the bearing and over the associated deformation, such as the deflection of the bearing under load, the ½ BE compression under pre-loading, or indeed taking account of the effects of centrifuging.

Another drawback results from calibrating the pre-loading system 10. It is necessary to have good control over the transient stage in which the operation of the bearing goes from two points of contact to four points of contact, or vice versa, it being understood that depending on the force and rotary speed profiles, it even happens that there is no solution that enables the transition to be made from four points of contact to two points of contact. This transition is encountered when the axial force from the rotor transmitted to the bearing via the synchronization cone is less than a threshold force. Under such circumstances, the gap opens. The bearing is still driven in rotation, but the balls are subjected both to the force from the rotor via the cone and to the force from the pre-loading system. The operation of the bearing can then become unstable temporarily (operating with three points of contact, balls sliding, or indeed contact being lost), which is particularly harmful to its lifetime. That is associated in part with the fact that the orientation of the axial force associated with the pre-loading is the same as that associated with the rotor. The pre-loading system must then be defined in such a manner as to limit such unstable operation as much as possible during engagement and disengagement stages. That requires a good estimate of the threshold force at which pre-loading becomes involved, and also good estimates of the operation of the bearing itself (stiffness, deformation, effects of centrifuging the balls, . . . ). That also requires good knowledge of how the axial force from the rotor varies as a function of the speed of rotation, which is particularly difficult to determine during the stage in which the speed of rotation of the shaft is varying quickly and in which the rotary machine might be operating under conditions that are very different from its nominal conditions.

Yet another drawback is that the prior art axial thrust bearing is particularly complex to manufacture. It requires good control over very small clearances, both in the gap and between the balls and the outer half-ring during the stage of operating with two points of contact. That leads to very tight manufacturing tolerances being defined for the tracks of the outer ring of the bearing, thus making it difficult and expensive to manufacture in practice.

OBJECT AND DEFINITION OF THE INVENTION

The present invention seeks to remedy the above-mentioned drawbacks by proposing a disengageable axial thrust bearing for a rotary machine, the thrust bearing comprising an inner ring arranged around a rotary shaft in radially non-interfering manner on said shaft, a synchronization element mounted on said rotary shaft to drive rotation of said inner ring selectively, an outer ring comprising first and second outer half-rings centered in a casing and clamped in the axial direction between firstly a stationary thrust member and secondly a first pre-loading system exerting a first predetermined axial force, and oblique-contact rolling elements, the thrust member being characterized in that it further comprises a second pre-loading system inserted in the axial direction between said first and second outer half-rings and exerting a second predetermined axial force less than the first predetermined axial force such that, so long as the axial load exerted on the axial thrust bearing via the synchronization element is greater than a determined threshold value, each of the rolling elements presents a single line with two points of contact respectively with the inner ring and with the first outer half-ring, the second outer half-ring being spaced apart from the first by the second predetermined axial force exerted by the second pre-loading system, and such that the inner ring is driven in rotation by said synchronization element, whereas, when the axial load exerted on the axial thrust bearing becomes less than this determined threshold value, a second line with two additional points of contact is created between each of the rolling elements and respectively the inner ring and the second outer half-ring such that the axial thrust bearing is disengaged, with rotation of the inner ring stopping as a result of inertia and friction internal to the thrust bearing via the four points of contact between each rolling element and the inner ring and the first and second outer half-rings.

Adding the second pre-loading system facilitates operation with two points of contact when the axial thrust bearing becomes involved. By spacing apart the two outer half-rings, the system makes it possible to avoid operating for long periods of time with three points of contact, which can degrade the bearing, while also making it easier to design the bearing in spite of the addition of a new part (operation is simpler, and there is better control over the transition between four points of contact to two points of contact than in the prior art).

Preferably, the first and second pre-loading systems comprise respective resilient assemblies advantageously made up of one or more spring washers.

Advantageously, the first pre-loading system exerts an axial force in the direction opposite to the axial load exerted on the axial thrust bearing via the synchronization element, and the second pre-loading system is held in position by an annular clip that is positioned in respective grooves associated in each of the outer half-rings.

In a variant embodiment, the outer half-ring providing the first line of points of contact presents a width that is greater than the width of the other outer half-ring providing the second line of points of contact.

Advantageously, the rolling elements are balls and the stationary thrust member may form a portion of the casing.

Preferably, the axial thrust bearing includes clearance localized between the first pre-loading system between the outer half-ring and the casing, which clearance is not zero so long as the axial load exerted on the axial thrust bearing is less than the determined threshold value.

The disengageable axial thrust bearing of the invention is advantageously applied to a cryogenic rotary machine and more particularly to such a machine having an active axial balancing system under steady conditions.

BRIEF DESCRIPTION OF THE DRAWINGS

Other characteristics and advantages of the invention appear from the following description of particular embodiments given as examples with reference to the accompanying drawings, in which.

DETAILED DESCRIPTION OF PREFERRED EMBODIMENTS

Figure 1:
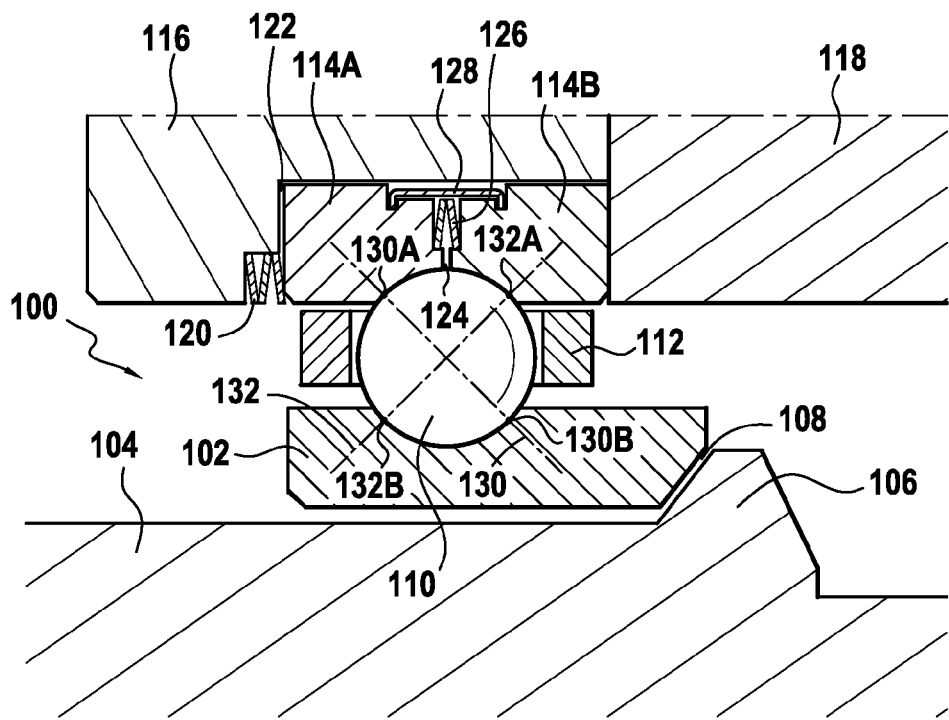
FIG. 1 is an axial half-section view of a first embodiment of a disengageable axial thrust bearing of the invention.

FIG. 1 shows an embodiment of a disengageable axial thrust bearing of the invention. The thrust bearing 100 comprises an inner ring 102 mounted in radially non-interfering manner on a central shaft 104 that may be secured to an impeller of a cryogenic rotary machine, for example. The central shaft is advantageously mounted on conventional bearings, of fluid type, of leaf type, of magnetic type, or of other type, not shown in the drawing, and the rotary machine is advantageously fitted with a system for providing active axial balancing under steady conditions.

Examples of systems for active axial balancing are described by way of example in patent documents FR 2 698 666 and FR 2 698 667.

The inner ring 102 is provided with rotary drive by a synchronization element 106 that, in the absence of axial loading, is spaced apart from the inner ring by first clearance 108 of the order of a few hundredths of a millimeter to several millimeters.

The axial thrust bearing has oblique-contact rolling elements 110, such as balls, held in a cage 112 and arranged between the inner ring 102 and an outer ring 114 made up of two portions 114A and 114B that are centered in a casing 116 in which they can slide in the axial direction during certain stages of operation.

The outer half-rings 114A and 114B are clamped in the axial direction between firstly a portion of the casing or a stationary thrust member 118 secured to the casing 116, and secondly a first pre-loading system 120 constituted by a resilient assembly, e.g. one or more spring washers exerting a first predetermined axial force, e.g. of the order of several hundreds of newtons, such that, so long as the axial load exerted on the axial thrust bearing via the synchronization element 106 is zero or below a given threshold (e.g. likewise of the order of several hundreds of newtons), which threshold depends on the speed of rotation, second clearance 122 is created having a width of a few hundredths of a millimeter to several millimeters between the outer half-ring 114A and the casing 116 (located beside the first pre-loading system 120), the outer half-rings 114A and 114B themselves being spaced apart by a gap 124 of several millimeters that is held open by a second pre-loading system 126 arranged between the outer half-rings and likewise constituted by a resilient assembly, e.g. made up of one or more spring washers, exerting a second predetermined axial force, less than the first predetermined axial force, e.g. of the order of a few tens of newtons. These spring washers are advantageously held in position by an annular clip 128 taking up position in an associated groove in each of the outer half-rings.

Depending on the stages of operation of the axial thrust bearing as described in detail below, the rolling elements 110 may each present relative to the inner and outer rings either a first oblique line 130 having two points of contact 130A and 130B respectively with the inner ring 102 and with the first outer half-ring 114A, or else both a first oblique line 130 with the same two first points of contact and also a second oblique line 132 with two other points of contact 132A and 132B, respectively with the outer half-ring 114B and once more with the inner ring 102.

Depending on its operating stages, the operation of the disengageable axial thrust bearing in accordance with the invention thus presents either two or four points of contact, and this is described below by describing successively in detail the main stages of operation, which are four in number.

The first stage is considered as being the stage during which the shaft does not exert any force on the axial thrust bearing. During this stage, the first clearance 108 is open, and as a result of the first predetermined axial force from the first pre-loading system 120 being greater than the force exerted by the second pre-loading system 126, the second clearance 122 is also open, and the outer half-rings 114A and 114B bear against the stationary portion of the casing 118 and they are spaced apart by the gap 124. Under such circumstances, the balls of the bearing 110 are in oblique contact with the inner ring 102 and the outer half-rings 114A and 114B via the four points of contact 130A, 130B, 132A, and 132B (FIG. 1).

Figure 2:
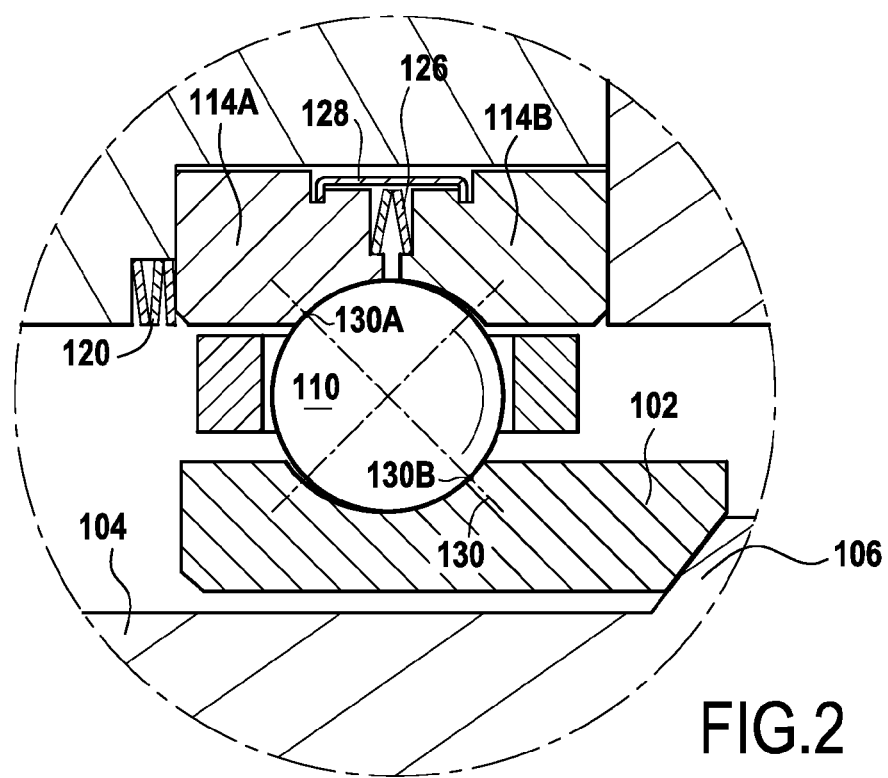
FIG. 2 is an enlarged view of FIG. 1 during a stage of operation with two points of contact between a rolling element and inner and outer rings.

The second stage is constituted by the engagement stage shown in FIG. 2. In this stage, the direction of the axial force from the shaft goes towards the thrust member, and the first clearance 108 closes. As soon as the synchronization element 106 comes into contact with the inner ring 102, the bearing is driven in rotation and the shaft then exerts an axial force on the thrust member. So long as this axial force is less than a threshold value, the second clearance 122 remains open and the bearing operates under transitional conditions that are potentially unstable (with three points of contact, balls sliding, . . . ). Nevertheless, this stage of operation is minimized by the introduction of the second pre-loading system 126 within the bearing itself, which enables the width of the gap 124 to be increased unlike the prior art solution. The axial thrust bearing takes up the axial thrust, its speed changes, and once the axial force exerted by the shaft is greater than the threshold value, the outer half-ring 114A slides in the casing 116 and the second clearance 122 closes. The second predetermined axial force exerted by the second pre-loading system 126 then widens the gap 124 by moving the outer half-ring 114A (together with the balls that are thus released from the opposite contacts 132A and 132B) away from the outer half-ring 114B, which itself remains pressed against its stationary thrust member 118 secured to the casing. The value is at a maximum when the second clearance 122 is zero. The bearing then operates via two points of contact 130A and 130B. The advantage of operating in this way is to minimize the power dissipated at the contacts 130A and 130B and to minimize wear by operating in the conventional manner for ball bearings.

The third stage is a stage during which the shaft exerts a force on the axial thrust bearing greater than the threshold value that enables the first pre-loading system 120 to be compressed. So long as the force remains greater than this threshold value, the second clearance 122 thus remains closed, with the outer half-ring 114A pressing against the casing 116. The bearing then operates via two points of contact. It is capable of withstanding significant levels of axial force. Since the other outer half-ring 114B is held pressed against the stationary thrust member 118, the clearance between the balls and the outer half-ring is selected so that the outer half-ring 114B does not interfere with the bearing operating via two points of contact. This clearance is associated directly with the second clearance 122, which can be adjusted on assembly.

Finally, the fourth stage is constituted by the disengagement stage during which the axial force exerted by the shaft on the axial thrust bearing, still acting towards the thrust member, drops as a result of an active axial balancing system coming into operation until it drops to zero. Once its value becomes less than the threshold value, the second clearance 122 opens and the outer half-ring 114A together with the balls slide towards the other outer half-ring 114B, reestablishing contact 132A between the balls and the outer half-ring 114B. So long as the axial force exerted by the shaft is not zero, the bearing continues to be driven in rotation by the shaft and it is subjected both to the force exerted by the shaft and to the internal force including the force exerted by the second pre-loading system 126 that leads to the point of contact 132A. The bearing is then operating under transitional conditions that are potentially unstable and difficult to determine (with three points of contact, balls sliding, . . . ), and that must be minimized, as explained above. Once the force exerted by the shaft is zero and then negative, the first clearance 108 opens and the point of contact 132B is then acquired. The bearing operates with four points of contact on the lines 130 and 132. The internal friction associated with operating in this way with four points of contact leads to the rotation of the inner ring of the bearing coming to a stop. This stopping of the rotation of the inner ring by passing successively via two points of contact to three and then to four gives rise to the inner ring 102 stopping smoothly (being subjected to braking that is progressive).

While the axial thrust bearing is operating with four points of contact 130A, 130B, 132A, and 132B, the bearing is no longer loaded and it is no longer driven in rotation mechanically (it is nevertheless still possible that it might be driven by fluid), thereby ensuring that the bearing is properly positioned axially.

Figure 3:
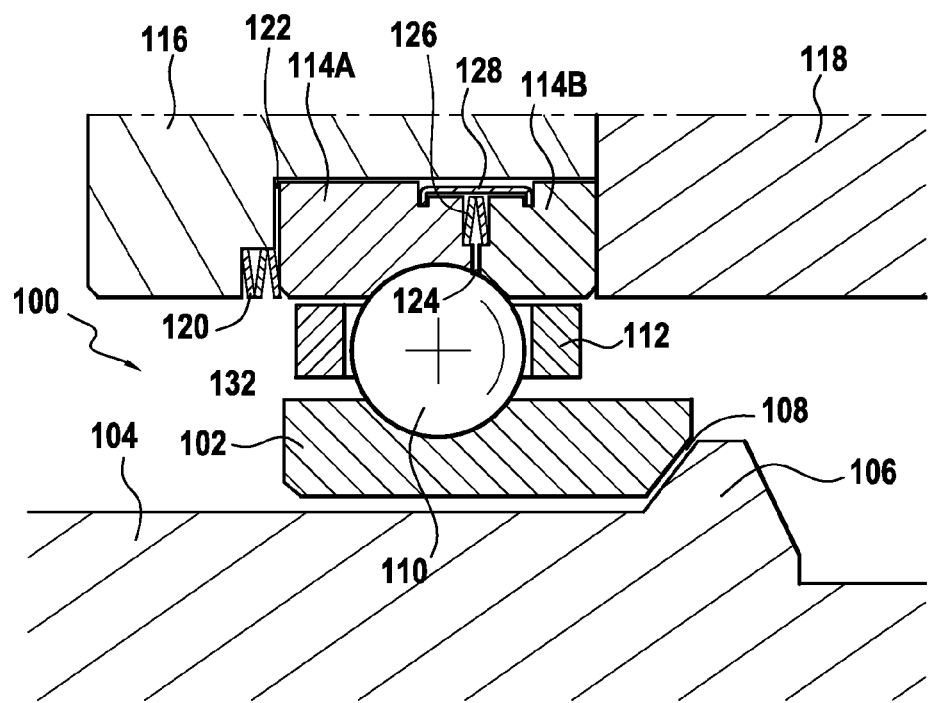
FIG. 3 is an axial half-section view of a second embodiment of a disengageable axial thrust bearing of the invention.
Figure 4:
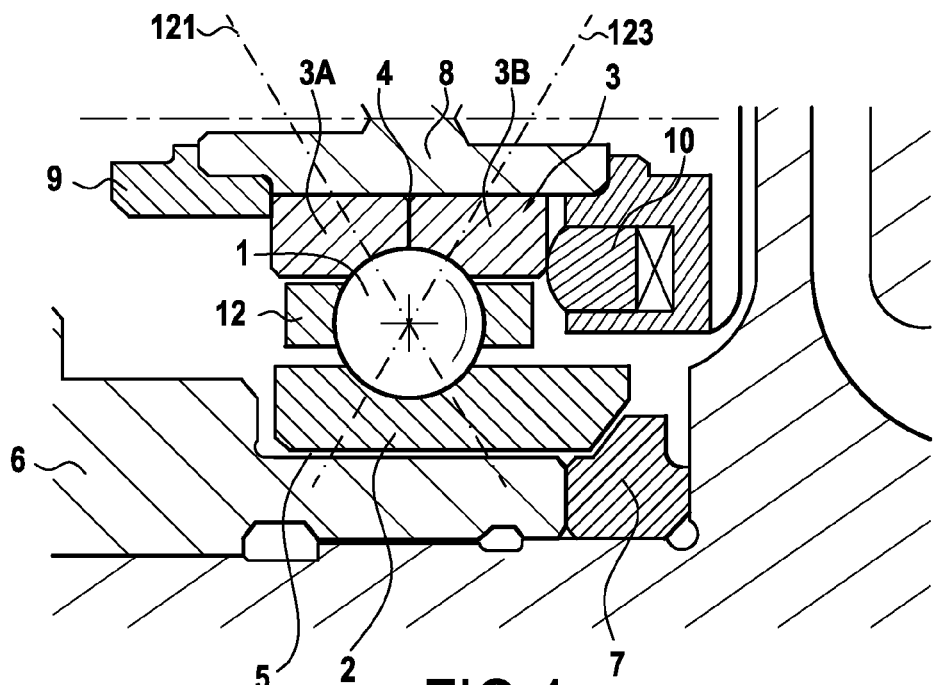
FIG. 4 is an axial half-section view of a prior art embodiment of a disengageable axial thrust bearing.

FIG. 3 shows a variant embodiment of the invention that enables the bearing area of the first point of contact of 130A to be increased. Depending on the speed of rotation and on the force from the shaft that is to be taken up by the bearing, it can happen during the stage of operation with two points of contact that it is necessary to cover a wide range of positions for the point of contact 130A with the outer half-ring 114A. Under such circumstances, the non-continuity of shape at the gap 124 between the two outer half-rings can turn out to be problematic. Thus, in this variant, the two outer rings 114A and 114B are selected to be non-symmetrical, the first outer half-ring 114A being wider than the second outer half-ring 114B so as to increase the bearing area available for the point of contact 130A.

With the invention, by introducing secondary pre-loading internally in the bearing (spring washer 126 located between the two outer half-rings 114A and 114B) there is no need to provide thermomechanical control over the gap and the clearances within the outer ring as in the prior art solution. Thus, when the bearing is subjected to the axial force from the shaft via the synchronization element 106 and is operating via two points of contact 130A and 130B, this secondary internal pre-loading serves to offset axially the outer half-ring 114B that is not involved in the operation of the bearing during this stage. This secondary pre-loading also serves to increase and to provide better control over the clearance between the balls 110 and this half-ring 114B that is potentially troublesome for the operation of the bearing. Compared with the prior art solution, this leads to the possibility of manufacturing tolerances between slacker for the internal ball tracks of the outer half-rings. Likewise, when the bearing is no longer subjected to the axial force from the shaft via the synchronization element 106, the main pre-loading serves to provide the bearing with stability. During this stage, operation via four points of contact and stability are ensured, providing the difference between the axial force exerted by the main pre-loading and the force exerted by the secondary axial pre-loading is greater than a given threshold. In addition, because of the half-ring 114B being mechanically moved away, the transition between the bearing operating with two points of contact to four points of contact is facilitated, thereby enabling the lifetime of the bearing to be improved. Finally, the threshold force exerted by the shaft at which the transition occurs between two points of contact and four points of contact is under better control: to a first approximation this is the difference between the axial force exerted by the main pre-loading and the force exerted by the secondary internal axial pre-loading.

The invention claimed is:

1. A disengageable axial thrust bearing for a rotary machine, the thrust bearing comprising an inner ring arranged around a rotary shaft in radially non-interfering manner on said shaft, a synchronization element mounted on said rotary shaft to drive rotation of said inner ring selectively, an outer ring comprising first and second outer half-rings centered in a casing and clamped in the axial direction between firstly a stationary thrust member and secondly a first pre-loading system exerting a first predetermined axial force, and oblique-contact rolling elements, wherein the thrust bearing further comprises a second pre-loading system inserted in the axial direction between said first and second outer half-rings and exerting a second predetermined axial force less than the first predetermined axial force such that, so long as the axial load exerted on the axial thrust bearing via the synchronization element is greater than a determined threshold value, each of the rolling elements presents a single line with two points of contact respectively with the inner ring and with the first outer half-ring, the second outer half-ring being spaced apart from the first by the second predetermined axial force exerted by the second pre-loading system, and such that the inner ring is driven in rotation by said synchronization element, whereas, when the axial load exerted on the axial thrust bearing becomes less than this determined threshold value, a second line with two additional points of contact is created between each of the rolling elements and respectively the inner ring and the second outer half-ring such that the axial thrust bearing is disengaged, with rotation of the inner ring stopping as a result of inertia and friction internal to the thrust member via the four points of contact between each rolling element and the inner ring and the first and second outer half-rings.

2. A disengageable axial thrust bearing according to claim 1, wherein the first and second pre-loading systems comprise respective resilient assemblies.

3. A disengageable axial thrust bearing according to claim 2, wherein said resilient assembly comprises one or more spring washers.

4. A disengageable axial thrust bearing according to claim 1, wherein the first pre-loading system exerts an axial force in the direction opposite to the axial load exerted on the axial thrust bearing via the synchronization element.

5. A disengageable axial thrust bearing according to claim 1, wherein the second pre-loading system is held in position by an annular clip that is positioned in respective grooves associated in each of the outer half-rings.

6. A disengageable axial thrust bearing according to claim 1, wherein the first outer half-ring providing a first line of points of contact includes a width that is greater than a width of the second outer half-ring providing a second line of points of contact.

7. A disengageable axial thrust bearing according to claim 1, wherein the rolling elements are balls.

8. A disengageable axial thrust bearing according to claim 1, wherein the stationary thrust member forms a portion of the casing.

9. A disengageable axial thrust bearing according to claim 1, wherein the thrust bearing includes a clearance localized between the first pre-loading system between the outer half-ring and the casing, wherein said clearance is not zero so long as the axial load exerted on the axial thrust bearing is less than the determined threshold value.

10. The use of a disengageable axial thrust bearing according to claim 1, in a cryogenic rotary machine, fitted with an active system for axial balancing under steady conditions.

* * * * *